United States Patent [19]

Brackett

[11] Patent Number: 4,588,337
[45] Date of Patent: May 13, 1986

[54] APPARATUS AND METHOD FOR MACHINING AN ENVELOPING-TYPE WORM SCREW

[75] Inventor: George E. Brackett, Cape Elizabeth, Me.

[73] Assignee: Maxaxam Corporation, Oradell, N.J.

[21] Appl. No.: 588,967

[22] Filed: Mar. 13, 1984

[51] Int. Cl.$^4$ .............................................. B23F 15/00
[52] U.S. Cl. ..................................... 409/48; 409/66
[58] Field of Search ................. 409/11, 20, 22, 48, 409/65, 66, 73, 76, 77, 78, 38, 40, 41, 50, 55, 54, 53

[56] References Cited

U.S. PATENT DOCUMENTS

| | | | |
|---|---|---|---|
| 490,503 | 1/1893 | Rominger | 409/48 |
| 921,593 | 5/1909 | Collier | 409/48 |
| 1,273,533 | 7/1918 | Pfahler | 74/464 |
| 2,344,323 | 3/1944 | Pelphrey | 409/48 |

FOREIGN PATENT DOCUMENTS

| | | | |
|---|---|---|---|
| 2727894 | 1/1978 | Fed. Rep. of Germany | 409/48 |
| 965645 | 10/1982 | U.S.S.R. | 409/48 |

*Primary Examiner*—Gil Weidenfeld
*Assistant Examiner*—Daniel W. Howell
*Attorney, Agent, or Firm*—Lerner, David, Littenberg, Krumholz & Mentlik

[57] ABSTRACT

A method and apparatus are disclosed for machining hourglass screw threads on an enveloping-type worm screw by engaging at least one angularly positioned cutter with a screw blank having an hourglass shape. The screw blank is rotated about its central longitudinal axis at the same time that each angularly positioned cutter is pivoted through the screw blank at a rate which is less than the rate of rotation of the screw blank.

39 Claims, 5 Drawing Figures

APPARATUS AND METHOD FOR MACHINING AN ENVELOPING-TYPE WORM SCREW

FIELD OF THE INVENTION

The present invention relates to a method and apparatus for machining enveloping-type worm screws which are adapted for use in a power transmission system utilizing a roller worm wheel, rather than a fixed tooth gear wheel.

BACKGROUND OF THE INVENTION

In copending U.S. patent application Ser. No. 588,969 filed concurrently herewith, which copending application is owned by the assignee of the present application and is entitled "IMPROVED POWER TRANSMISSION SYSTEM, there is disclosed a new and improved worm drive system which includes an enveloping-type worm screw and a roller worm wheel. More particularly, the roller worm wheel includes two sets of rollers inclined at an angle relative to a plane which divides the worm wheel into two symmetrical halves and which is normal to the worm wheel's axis of rotation. One set of rollers is positioned on one side of the imaginary plane of symmetry, while the other set of rollers is positioned on the opposite side of the imaginary plane of symmetry in a staggered relationship relative to the first set of rollers.

In Collier U.S. Pat. No. 921,593, a technique for cutting an eveloping-type worm screw is disclosed. The technique involves forming an hourglass screw thread using a cutter which is always directed at the central longitudinal axis of a worm screw blank. Accordingly, the hourglass screw thread is specifically designed to mate with roller teeth or fixed teeth which are always directed at the central longitudinal axis of the worm screw. The technique described in the Collier patent is, therefore, not suitable for machining an hourglass screw thread adapted to mate with the angularly positioned rollers of the roller worm wheel disclosed in the copending patent application identified above.

SUMMARY OF THE INVENTION

A primary object of the present invention is to manufacture an enveloping-type worm screw which is adapted to mate with the rollers of the worm wheel employed by the new and improved drive system disclosed in the above-identified copending application. This and other objects are accomplished in accordance with the present invention by mounting an hourglass-shaped screw blank such that the screw blank is rotatable about a first axis which is coincident with a central longitudinal axis of the screw blank. A first cutter is positioned on one side of the screw blank such that the first cutter is pivotable about a second axis arranged at an angle of 90° relative to the first axis. Further, the first cutter is positioned at a predetermined inclined angle relative to a plane which includes the first axis and which is normal to the second axis. The first cutter is also positioned such that its central longitudinal axis intersects the central longitudinal axis of the screw blank at a point intermediate two opposed ends of the screw blank. The screw blank is then rotated about the first axis at a first rate, while the first cutter is simultaneously pivoted about the second axis at a second rate which is less than the first rate, whereby the first cutter forms a first hourglass screw thread in the screw blank.

In order to machine a second hourglass screw thread in the screw blank, a second cutter is positioned on an opposite side of the screw blank such that the second cutter is pivotable about a third axis arranged at an angle of 90° relative to the first axis. Further, the second cutter is positioned at a predetermined inclined angle relative to a plane which includes the first axis and which is normal to the third axis. The second cutter is also positioned such that its central longitudinal axis intersects the central longitudinal axis of the screw blank at a point intermediate the two opposed ends of the screw blank. After the second cutter is so positioned, it is pivoted about the third axis at the same rate as the first cutter, while the screw blank is simultaneously rotated about the first axis at the first rate.

Alternatively, the first cutter can machine both the first hourglass screw thread and the second hourglass screw thread by remounting the screw blank, after the machining of the first hourglass screw thread, such that the two opposed ends of the screw blank are reversed and such that the screw blank is again rotatable about the first axis. After locating the remounted screw blank in a position in which the first cutter will cut the second hourglass screw thread without interfering with the first hourglass screw thread, the screw blank is rotated about the first axis at the first rate, while the first cutter is simultaneously pivoted about the second axis at the second rate.

BRIEF DESCRIPTION OF THE DRAWINGS

For a more complete understanding of the present invention, reference is made to the following detailed description of two exemplary embodiments considered in conjunction with the accompanying drawings in which.

DESCRIPTION OF THE EXEMPLARY EMBODIMENTS

The present invention is especially useful in connection with the manufacture of worm drive systems like those described and illustrated in copending U.S. patent application Ser. No. 588,969 filed concurrently herewith, which copending application is owned by the assignee of the present application and is entitled "IMPROVED POWER TRANSMISSION SYSTEM". For the details of the construction and operation of such worm drive systems, reference is made to the copending application identified above, the specification of which is incorporated herein by reference.

In order to facilitate consideration and discussion of the exemplary embodiments of the present invention described in detail below, it is assumed that the invention will be constructed and operated so as to manufacture a worm screw for a twelve to one ratio worm drive system, which also includes a worm wheel having a four inch radius and two sets of rollers inclined at an angle of thirty degrees relative to a plane which divides the worm wheel into two symmetrical halves and which is normal to the worm wheel's axis of rotation, one set of rollers being positioned on one side of the imaginary plane of symmetry and the other set of rollers being positioned on the opposite side of the imaginary plane of symmetry in a staggered relationship relative to the first set of rollers. The present invention does, of course, permit the machining of worm screws for worm drive systems having other ratios and worm wheels of various sizes and roller orientations.

With reference to FIGS. 1-5, there is shown a machine 10 for manufacturing an enveloping-type worm screw for use with the specific worm drive system described above. More particularly, the machine 10 includes a support table 12 having a horizontal top 14. A base plate 16, having suitable bearings (not shown), is slidably and pivotally mounted on the top 14 of the support table 12. An angular mounting block 18 is attached to the base plate 16. The mounting block 18 carries a slide 20, which slidably receives a variable speed motorized quill head 22. The quill head 22 may, for example, be a Bridgeport Model SP-651-BJC4-203D having a chuck 24 adapted to removably support a cutter 26 (see FIGS. 2-5), such as a fifteen degree tapered end mill, for rotation about an axis of rotation 28 (see FIG. 5).

A conventional twelve to one ratio worm gear unit 30 is mounted underneath the top 14 of the support table 12. The worm gear unit 30 includes a horizontally arranged input shaft 32 (see Fig, 2) and a vertically arranged output shaft 34 (see FIGS. 2, 4, and 5), which rotates once for every twelve revolutions of the input shaft 32.

The input shaft 32 is fixedly attached to an input shaft gear 36 (see FIG. 1), which meshes with a drive gear 37 (see FIG. 1) of a variable speed electric motor 38, mounted on one side of the support table 12. Electrical controls 40 for the motor 38 are mounted on the front of the support table 12.

The output shaft 34 of the worm gear unit 30 extends upwardly through an opening (not shown) in the top 14 of the support table 12. The output shaft 34 is fixedly attached to the base plate 16 so that the base plate 16 rotates conjointly with the output shaft 34 about a central longitudinal axis 42 (see FIG. 5) of the output shaft 34.

Pillow blocks 44, 46, which are adjustably mounted on the top 14 of the support table 12, rotatably support a screw blank 48 (see FIG. 4) for rotation about a central longitudinal axis 50 (see FIG. 5) of the screw blank 48. The screw blank 48 has an hourglass shape characterized by opposed cylindrical ends 52, 54 and a parabolic midsection 56. The opposed ends 52, 54 of the screw blank 48 are attached to bearings 58, 60, respectively, rotatably supported in the pillow blocks 44, 46, respectively.

Figure 1:
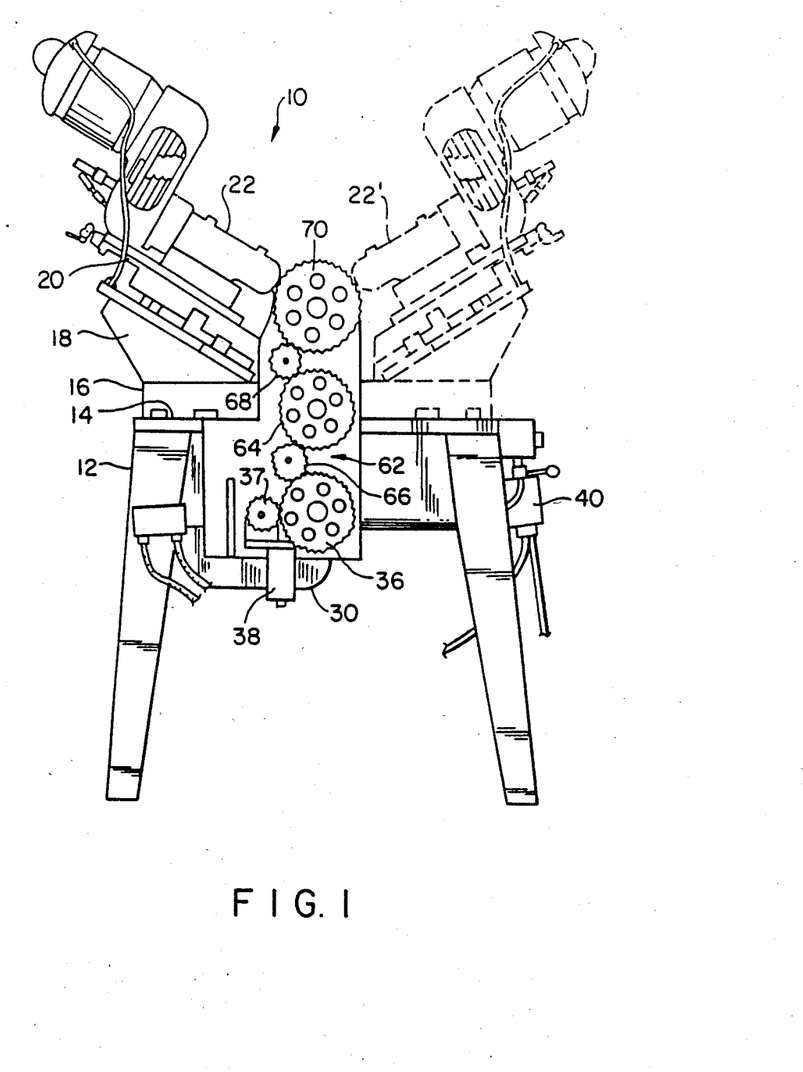
FIG. 1 is a right side elevational view of a thread-cutting machine adapted to manufacture an enveloping-type worm screw in accordance with the present invention.
Figure 2:
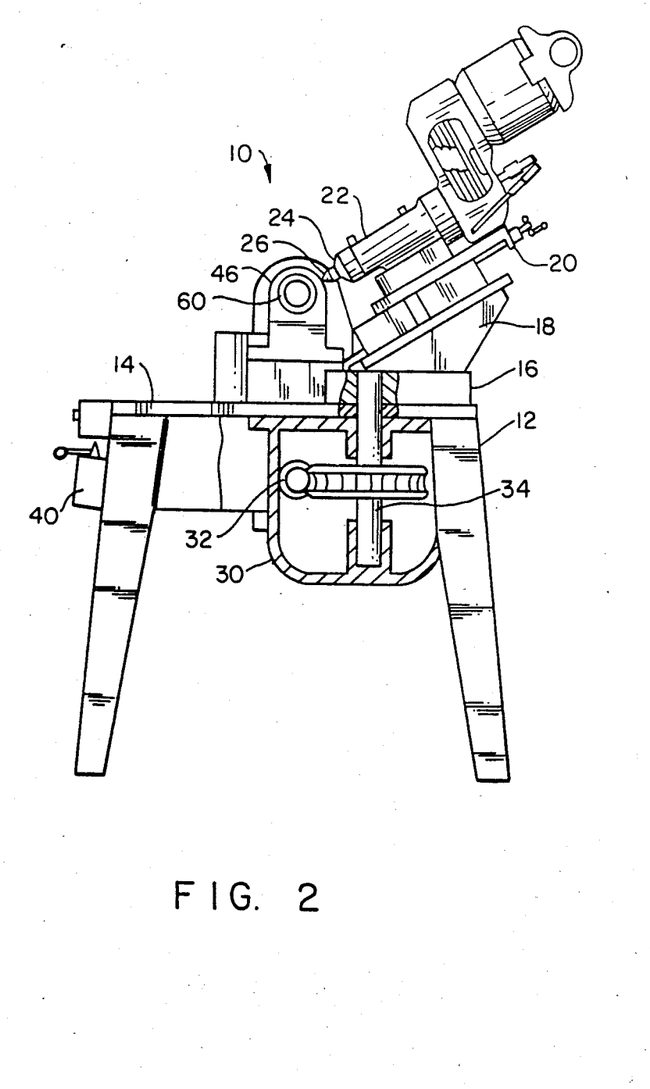
FIG. 2 is a left side elevational view of the machine illustrated in solid lines in FIG. 1, a portion of the machine being broken away to facilitate consideration and discussion.
Figure 3:
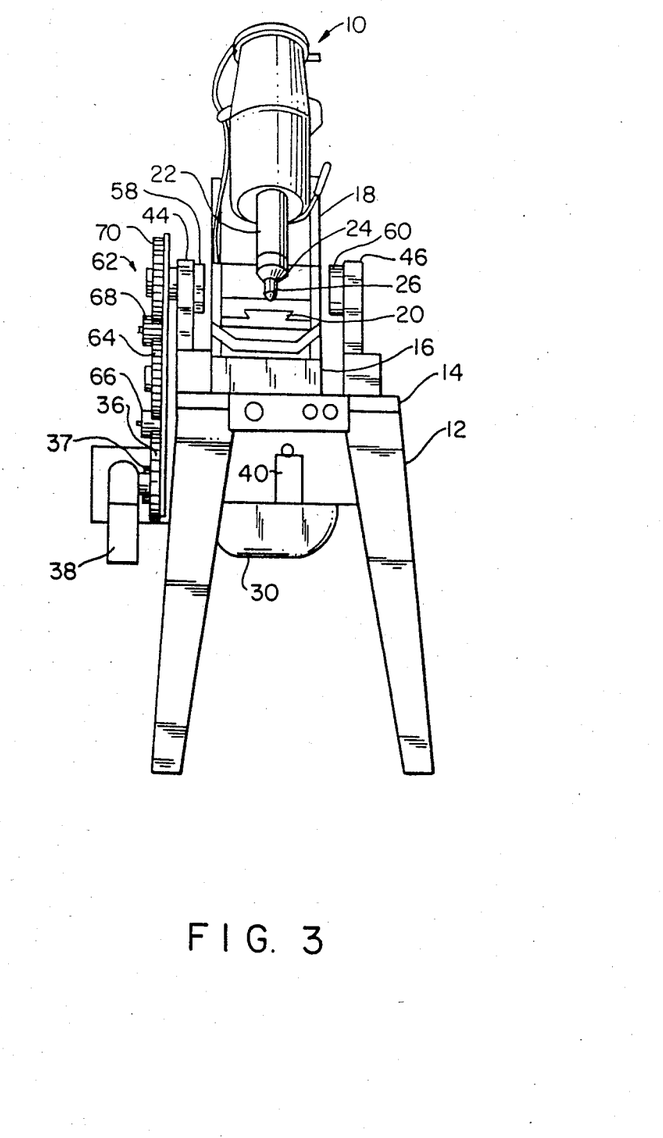
FIG. 3 is a front elevational view of the machine illustrated in solid lines in FIGS. 1 and 2.
Figure 4:
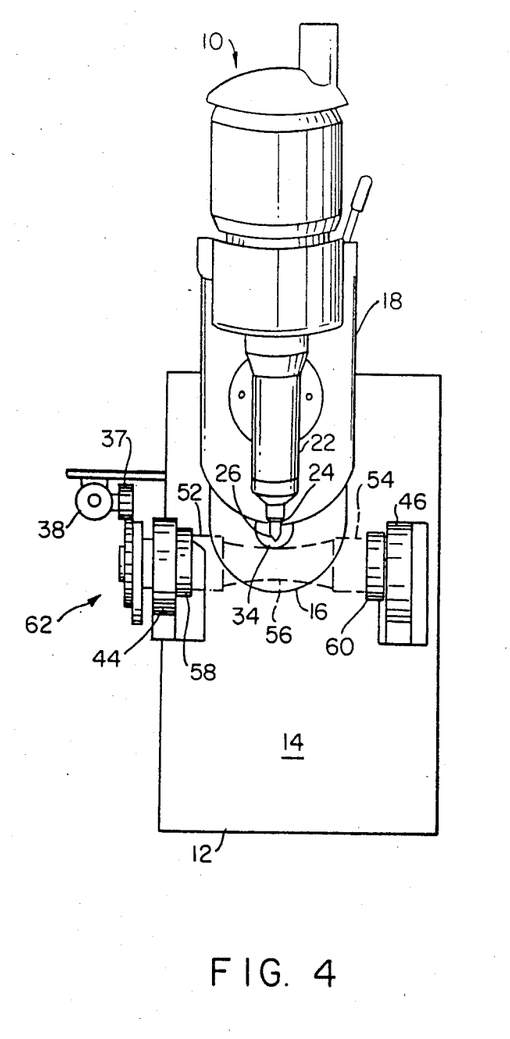
FIG. 4 is a top view of the machine illustrated in solid lines in FIGS. 1-3.
Figure 5:
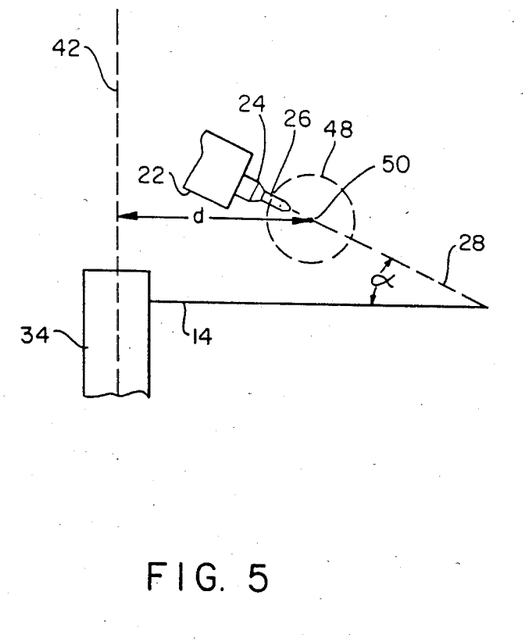
FIG. 5 is a diagrammatic illustration of the relationship between various elements of the machine shown in FIGS. 1-4.

With particular reference to FIG. 1, the bearing 58 of the pillow block 44 is connected to and driven by the drive gear 37 of the motor 38 through a gearing system 62, which includes the input shaft gear 36, a large idler gear 64, two small idler gears 66, 68 and a pillow block gear 70. The gearing system 62 is designed such that the screw blank 48 makes one complete revolution about its central longitudinal axis 50 for each complete revolution of the input shaft 32 of the worm gear unit 30. Inasmuch as the output shaft 34 of the worm gear unit 30 rotates once for every twelve revolutions of the input shaft 32, the screw blank 48 which rotates at the same rate as the input shaft 32, revolves twelve times for each complete revolution of the quill head 22, which rotates conjointly with the output shaft 34, about the central longitudinal axis 42 of the output shaft 34.

In order to machine the desired worm screw from the screw blank 48, the pillow blocks 44, 46 are located such that the shortest distance (d) between the central longitudinal axis 50 of the screw blank 48 and the central longitudinal axis 42 of the output shaft 34 is four inches (see FIG. 5), which distance (d) corresponds to the radius of the worm wheel to be used in combination with the worm screw machine from the screw blank 48. The cutter 28 is positioned at an inclined angle ($\alpha$) relative to the top 14 of the support table 12 and hence to the horizontal (see FIG. 5). The angle ($\alpha$) is selected so as to match the angle of the rollers employed by the worm wheel of the contemplated worm gear set. Thus, the angle ($\alpha$) is thirty degrees. The quill head 22 is positioned such that a vertical plane containing the axis of rotation 28 of the cutter 26 is normal to the central longitudinal axis 50 of the screw blank 48 at a point intermediate the opposed ends 52, 54 of the screw blank 48, the screw blank 48 being symmetrical about this vertical plane when the plane intersects such an intermediate point on the screw blank 48. With the quill head 22 so positioned, the cutter 26 is located at a height selected such that its axis of rotation 28 intersects the central longitudinal axis 50 of the screw blank 48 intermediate the ends 52, 54 of the screw blank 48. The depth of the cut to be made by the cutter 26 can be selected by moving the quill head 22 up or down the slide 20.

Upon actuation of the motor 38, the drive gear 37 of the motor 38 rotates the input shaft gear 36 which, in turn, rotates the input shaft 32 of the worm gear unit 30. The worm gear unit 30 is designed such that the output shaft 34 makes one revolution for every twelve revolutions of the input shaft 32. The rotation of the output shaft 34 is transferred to the quill head 22 through the base plate 16. The controls 40 for the motor 38 are such that the direction of rotation of the drive gear 37 can be reversed, whereby the output shaft 34 and, hence, the quill head 22 can be rotated in a clockwise direction or in a counterclockwise direction. Reversing the direction of rotation of the drive gear 37 of the motor 38 would also, of course, reverse the direction of rotation of the screw blank 48 about its central longitudinal axis 50.

The gearing system 60 is designed such that the screw blank 48 rotates twelve times during the period that it takes the quill head 22 and, hence, the cutter 26 to make one complete revolution about the central longitudinal axis 42 of the output shaft 34 of the worm gear unit 30. During a typical milling operation, the quill head 22 does not, however, make a complete revolution about the axis 42. Rather, the quill head 22 rotates through an arc which is less than three hundred and sixty degrees. The length of this arc, which is typically about forty five degrees, is determined by the diameter of the screw blank 48.

In order to cut a first hourglass screw thread in the screw blank 48, the cutter 26 is set for the depth of cut desired for the first pass of the cutter 26 through the screw blank 48. The quill head 22 is then positioned such that the cutter 26 is pointed in the general direction of the pillow block 44, the cutter 26 being out of contact with the screw blank 48. When the quill head 22 is so positioned, the axis of rotation 28 of the cutter 26 does not intersect the central longitudinal axis 50 of the screw blank 48 but rather extends below the central longitudinal axis 50. The quill head 22 is then rotated about the central longitudinal axis 42 of the output shaft 34 in a counterclockwise direction selected to move the quill head 22 toward the end 54 of the screw blank 48. As the quill head 22 is so rotated, the cutter 26, which is rotating about its axis of rotation 28, contacts the screw blank 48, which is also rotating about its central longitudinal axis 50, to make the initial cut for the first hourglass screw thread. When the cutter 26 reaches a point intermediate the ends 52, 54 of the screw blank 48, the axis of rotation 28 of the cutter 26 intersects the central longitudinal axis 50 of the screw blank 48. As the quill head 22 continues its counterclockwise rotation, the axis of rotation 28 of the cutter 26 again falls below the central longitudinal axis 50 of the screw blank 48. Thus, the cutter 26 traces a pass which is parabolic relative to the central longitudinal axis 50 of the screw blank 48. This parabolic path matches the parabolic curve of the parabolic midsection 56 of the screw blank 48. The parabolic path traced by the cutter 26 also simulates the path that one set of worm wheel rollers will take as they roll through the worm screw to be machined from the screw blank 48.

After making the initial pass described above, the quill head 22 is moved up the slide 20 so that the cutter 26 will not contact the screw blank 48 as the quill head 22 is rotated in a clockwise direction to return it to its starting position (i.e., to a position in which the cutter 26 is pointed in the general direction of the pillow block 44). The quill head 22 is then moved down the slide 22 to a position in which the cutter 26 will make a slightly deeper cut in the screw blank 48. As the cutter 26 passes back through the screw blank 48, the cutter 26 retraces its initial parabolic path. The number of passes required of the cutter 26 depends upon the desired depth of the first hourglass screw thread to be machined in the screw blank 48.

In order to generate a second hourglass screw thread for the other set of worm wheel rollers, the screw blank 48 is removed from the bearings 58, 60 of the pillow blocks 44, 46 and, before being remounted in the bearings 58, 60, turned end over end so that, upon remounting, the end 52 is mounted in the bearing 60 and the end 54 is mounted in the bearing 58. The quill head 22 is then returned to its starting position in the manner described above. After setting the cutter 26 for the desired depth of the initial cut and manually or otherwise rotating the screw blank 48 to a predetermined angular position in which the first hourglass screw thread will not be interfered with by the second hourglass screw thread, the cutter 26 is rotated in a counterclockwise direction to make the initial cut for the second hourglass screw thread. As the cutter 26 passes through the screw blank 48, the cutter 26 traces a path which is parabolic relative to the central longitudinal axis 50 of the screw blank 48. This parabolic path, which also matches the parbolic curve of the parabolic midsection 56 of the screw blank 48, simulates the path that the other set of worm wheel rollers will take as they roll through the worm screw to be machined from the screw blank 48. Additional passes of the cutter 26 are made as described above until the second hourglass screw thread reaches the desired depth.

The two hourglass screw threads can also be generated without reverse mounting the screw blank 48. With reference to FIG. 1, the machine 10 can be provided with another quill head 22' which is identical in construction and operation to the quill head 22, except that the quill head 22' is mounted on an opposite side of the screw blank 48 from the quill head 22. In operation, the quill head 22' rotates simultaneously with and at the same rate as the quill head 22. During such rotation of the quill heads 22, 22', which can be accomplished by suitably gearing the output shaft 34 of the worm gear unit 30 to a corresponding drive shaft for the quill head 22', the quill heads 22, 22' would preferably rotate in opposite directions (i.e., the quill head 22 would rotate in a counterclockwise direction as the quill head 22' rotates in a clockwise direction and vice versa). In order to prevent the two hourglass screw threads from interfering with each other, a cutter (not shown) associated with the quill head 22' would trail the cutter 26 by a distance determined by the value of the lead angle of the screw threads.

As indicated above, the machine 10 is adapted to permit the machining of worm screws for worm drive systems having other ratios and worm wheels of various sizes and roller orientations. For instance, the angle ($\alpha$) of the cutter 26 can be varied by changing the angle of the mounting block 18. If a change in ratio is desired, the worm gear unit 30 can be removed and replaced with another conventional worm gear unit of a desired ratio. Also, the distance (d) between the central longitudinal axis 50 of the screw blank 48 and the central longitudinal axis 42 of the output shaft 34 of the worm gear unit 30 can be varied by adjusting the position of the pillow blocks 44, 46 relative to the top 14 of the support table 12.

It will be understood that the embodiments described herein are merely exemplary and that a person skilled in the art may make many variations and modifications without departing from the spirit and scope of the invention. For instance, instead of employing one motor to drive the screw blank 48 and the quill head 22, the screw blank 48 and the quill head 22 can be driven by independent power sources which are synchronized so as to achieve the desired ratio between the rates of rotation of the screw blank 48 and the quill head 22. Also, the quill head 22 and the cutter 26 could be replaced with a hobbing disk or a similar device. All such modifications and variations are intended to be included within the scope of the invention as defined in the appended claims.

I claim:

1. A method of machining an enveloping-type worm screw from a screw blank having an hourglass shape, two opposed ends and a central longitudinal axis, said method comprising the steps of mounting said screw blank such that said screw blank is rotatable about a first axis which is coincident with said central longitudinal axis of said screw blank; positioning a first cutter, having a central longitudinal axis, on one side of said screw blank such that said first cutter is pivotable about a second axis arranged at an angle of 90° relative to said first axis, said first cutter being positioned at a predetermined inclined angle relative to a plane which inlcudes said first axis and which is normal to said second axis and said first cutter being positioned such that said central longitudinal axis of said first cutter intersects said central longitudinal axis of said screw blank at a point intermediate said two opposed ends of said screw blank, whereby said central longitudinal axis of said first cutter moves away from said central longitudinal axis of said screw blank, in a direction normal to said plane, when said first cutter is pivoted about said second axis in either direction to thereby move said central longitudinal axis of said first cutter away from said point; and rotating said screw blank about said first axis at a first rate while simultaneously pivoting said first cutter about said second axis at a second rate which is less than said first rate, whereby said first cutter forms a first hourglass screw thread in said screw blank.

2. A method according to claim 1, further comprising the step of revolving said first cutter about its central longitudinal axis as said first cutter is pivoted about said second axis.

3. A method according to claim 1, further comprising the steps of positioning a second cutter, having a central longitudinal axis, on an opposite side of said screw blank such that said second cutter is pivotable about a third axis arranged at an angle of 90° relative to said first axis, said second cutter being positioned at a predetermined inclined angle relative to a plane which includes said first axis and which is normal to said third axis and said second cutter being positioned such that said central longitudinal axis of said second cutter intersects said central longitudinal axis of said screw blank at a point intermediate said two opposed ends of said screw blank, whereby said central longitudinal axis of said second cutter moves away from said central longitudinal axis of said screw blank, in a direction normal to said plane, when said second cutter is pivoted about said third axis in either direction to thereby move said central longitudinal axis of said second cutter away from said point; and pivoting said second cutter about said third axis at said second rate during the simultaneous rotation of said screw blank about said first axis at said first rate, whereby said second cutter forms a second hourglass screw thread in said screw blank.

4. A method according to claim 3, further comprising the steps of revolving said first cutter about its central longitudinal axis as said first cutter is pivoted about said second axis and revolving said second cutter about its central longitudinal axis as said second cutter is pivoted about said third axis.

5. A method according to claim 3, wherein said second cutter trails said first cutter by a distance determined by the value of the lead angle of said first and second hourglass screw threads, whereby said first and second hourglass screw threads do not interfere with each other.

6. A method according to claim 1, further comprising the steps of remounting said screw blank such that said two opposed ends of said screw blank are reversed and such that said screw blank is again rotatable about said first axis, positioning said remounted screw blank such that said first cutter will cut a second hourglass screw thread which does not interfere with said first hourglass screw thread and rotating said remounted screw blank about said first axis at said first rate while simultaneously pivoting said first cutter about said second axis at said second rate, whereby said first cutter forms a second hourglass screw thread in said screw blank.

7. A method according to claim 1, wherein said first and second axes are spaced apart a predetermined distance equal to the radius of a worm wheel adapted for use in combination with said worm screw.

8. A method according to claim 7, wherein said predetermined distance is adjustable.

9. A method according to claim 1, wherein said first and second rates are variable so as to achieve any desired ratio between them.

10. Apparatus for machining an enveloping-type worm screw from a screw blank having an hourglass shape, two opposed ends and a central longitudinal axis, said apparatus comprising first mounting means for mounting said screw blank such that said screw blank is rotatable about a first axis which is coincident with said central longitudinal axis of said screw blank; first positioning means for positioning a first cutter, having a central longitudinal axis, on one side of said screw blank such that said first cutter is pivotable about a second axis arranged at an angle of 90° relative to said first axis, said first cutter being positioned at a predetermined inclined angle relative to a plane which includes said first axis and which is normal to said second axis and said first cutter being positioned such that said central longitudinal axis of said first cutter intersects said central longitudinal axis of said screw blank at a point intermediate said two opposed ends of said screw blank, whereby said central longitudinal axis of said first cutter moves away from said central longitudinal axis of said screw blank, in a direction normal to said plane, when said first cutter is pivoted about said second axis in either direction to thereby move said central longitudinal axis of said first cutter away from said point; first rotating means for rotating said screw blank about said first axis at a first rate; and first pivoting means for pivoting said first cutter about said second axis at a second rate which is less than said first rate, said first cutter being pivoted as said screw blank rotates, whereby said first cutter forms a first hourglass screw thread in said screw blank.

11. Apparatus according to claim 10, further comprising revolving means for revolving said first cutter about its central longitudinal axis as said first cutter is pivoted about said second axis.

12. Apparatus according to claim 10, further comprising second mounting means for mounting a second cutter, having a central longitudinal axis, on an opposite side of said screw blank such that said second cutter is pivotable about a third axis arranged at an angle of 90° relative to said first axis, said second cutter being positioned at a predetermined inclined angle relative to a plane which includes said first axis and which is normal to said third axis and said second cutter being positioned such that said central longitudinal axis of said second cutter intersects said central longitudinal axis of said screw blank at a point intermediate said two opposed ends of said screw blank, whereby said central longitudinal axis of said second cutter moves away from said central longitudinal axis of said screw blank, in a direction normal to said plane, when said second cutter is pivoted about said third axis in either direction to thereby move said central longitudinal axis of said second cutter away from said point, and second pivoting means for pivoting said second cutter about said third axis at said second rate during the simultaneous rotation of said screw blank about said first axis at said first rate, whereby said second cutter forms a second hourglass screw thread in said screw blank.

13. Apparatus according to claim 12, further comprising first revolving means for revolving said first cutter about its central longitudinal axis as said first cutter is pivoted about said second axis and second revolving means for revolving said second cutter about its central longitudinal axis as said second cutter is pivoted about said third axis.

14. Apparatus according to claim 12, wherein said second cutter trails said first cutter by a distance 15. Apparatus according to claim 10, wherein said first and second axes are spaced apart a predetermined distance equal to the radius of a worm wheel adapted for use in combination with said worm screw.

16. Apparatus according to claim 15, further comprising adjusting means for adjusting said predetermined distance.

17. Apparatus according to claim 10, further comprising varying means for varying said first and second rates so as to achieve any desired ratio between them.

18. A method according to claim 1, wherein said inclined angle is about 30°.

19. A method according to claim 18, wherein said inclined angle is variable.

20. A method according to claim 7, wherein said worm wheel has a set of angularly arranged rollers and said inclined angle of said first cutter is the same as the angle of said rollers, whereby said first cutter simulates the path that said rollers would take as said rollers roll through said first hourglass screw thread.

21. A method according to claim 1, wherein said first cutter, during its pivotal movement, engages said screw blank adjacent one of said two opposed ends thereof and disengages said screw blank adjacent the other of said two opposed ends thereof.

22. A method according to claim 3, wherein said first and second axes are spaced apart a predetermined distance equal to the radius of a worm wheel adapted for use in combination with said worm screw and said first and third axes are spaced apart a predetermined distance equal to the radius of said worm wheel.

23. A method according to claim 22, wherein said worm wheel has a first set of angularly arranged rollers and a second set of angularly arranged rollers.

24. A method according to claim 23, wherein said inclined angle of said first cutter is the same as the angle of said first set of rollers, whereby said first cutter simulates the path that said rollers of said first set of rollers would take as said first set of rollers roll through said first hourglass screw thread, and said inclined angle of said second cutter is the same as the angle of said second set of rollers, whereby said second cutter simulates the path that said second set of rollers would take as said rollers of said second set of rollers roll through said second hourglass screw thread.

25. A method according to claim 3, wherein said inclined angle of said first cutter is about 30° and said inclined angle of said second cutter is about 30°.

26. A method according to claim 25, wherein said inclined angle of said first cutter is variable and said inclined angle of said second cutter is variable.

27. A method according to claim 5, wherein said first cutter is pivoted in one arcuate direction and said second cutter is pivoted in an opposite arcuate direction.

28. A method according to claim 27, wherein said first cutter, during its pivotal movement in said one arcuate direction, engages said screw blank adjacent one of said two opposed ends thereof and disengages said screw blank adjacent the other of said two opposed ends thereof and wherein said second cutter, during its pivotal movement in said opposite arcuate direction, engages said screw blank adjacent said one end thereof and disengages said screw blank adjacent said other end thereof.

29. Apparatus according to claim 10, wherein said inclined angle is about 30°.

30. Apparatus according to claim 29, further comprising varying means for varying said inclined angle.

31. Apparatus according to claim 15, wherein said worm wheel has a set of angularly arranged rollers and said inclined angle of said first cutter is the same as the angle of said rollers, whereby said first cutter simulates the path that said rollers would take as said rollers roll through said first hourglass screw thread.

32. Apparatus according to claim 10, wherein said first cutter, during its pivotal movement, engages said screw blank adjacent one of said two opposed ends thereof and disengages said screw blank adjacent the other of said two opposed ends thereof.

33. Apparatus according to claim 12, wherein said first and second axes are spaced apart a predetermined distance equal to the radius of a worm wheel adapted for use in combination with said worm screw and said first and third axes are spaced apart a predetermined distance equal to the radius of said worm wheel.

34. Apparatus according to claim 33, wherein said worm wheel has a first set of angularly arranged rollers and a second set of angularly arranged rollers.

35. Apparatus according to claim 34, wherein said inclined angle of said first cutter is the same as the angle of said first set of rollers, whereby said first cutter simulates the path that said first set of rollers would take as said rollers of said first set of rollers roll through said first hourglass screw thread, and said inclined angle of said second cutter is the same as the angle of said second set of rollers, whereby said second cutter simulates the path that said second set of rollers would take as said rollers of said second set of rollers roll through said second hourglass screw thread.

36. Apparatus according to claim 12, wherein said inclined angle of said first cutter is about 30° and said inclined angle of said second cutter is about 30°.

37. Apparatus according to claim 36, further comprising first varying means for varying said inclined angle of said first cutter and second varying means for varying said inclined angle of said second cutter.

38. Apparatus according to claim 14, wherein said first cutter is pivotable in one arcuate direction and said second cutter is pivotable in an opposite arcuate direction.

39. Apparatus according to claim 38, wherein said first cutter, during its pivotal movement in said one arcuate direction, engages said screw blank adjacent one of said two opposed ends thereof and disengages said screw blank adjacent the other of said two opposed ends thereof and wherein said second cutter, during its pivotal movement in said opposite arcuate direction, engages said screw blank adjacent said one end thereof and disengages said screw blank adjacent said other end thereof.

* * * * *

UNITED STATES PATENT AND TRADEMARK OFFICE
CERTIFICATE OF CORRECTION

PATENT NO. : 4,588,337

DATED : May 13, 1986

INVENTOR(S) : George E. Brackett

It is certified that error appears in the above-identified patent and that said Letters Patent is hereby corrected as shown below:

Column 1, line 31, "eveloping" should read --enveloping--.
Column 6, line 65, "inlcudes" should read --includes--.
Column 9, line 5, after "distance" insert --determined by the
    value of the lead angle of said first and second
    hourglass screw threads, whereby said first and second
    hourglass screw threads do not interfere with each
    other.--

Signed and Sealed this

Thirtieth Day of September 1986

[SEAL]

Attest:

DONALD J. QUIGG

Attesting Officer

Commissioner of Patents and Trademarks